No. 762,714. PATENTED JUNE 14, 1904.
G. HARWELL.
COTTON CHOPPER AND CULTIVATOR.
APPLICATION FILED JAN. 10, 1903.
NO MODEL. 2 SHEETS—SHEET 1.

Witnesses
M. Blondel
Charles Shaw

Inventor
G. Harwell.
By Meara & Brock
Attorneys

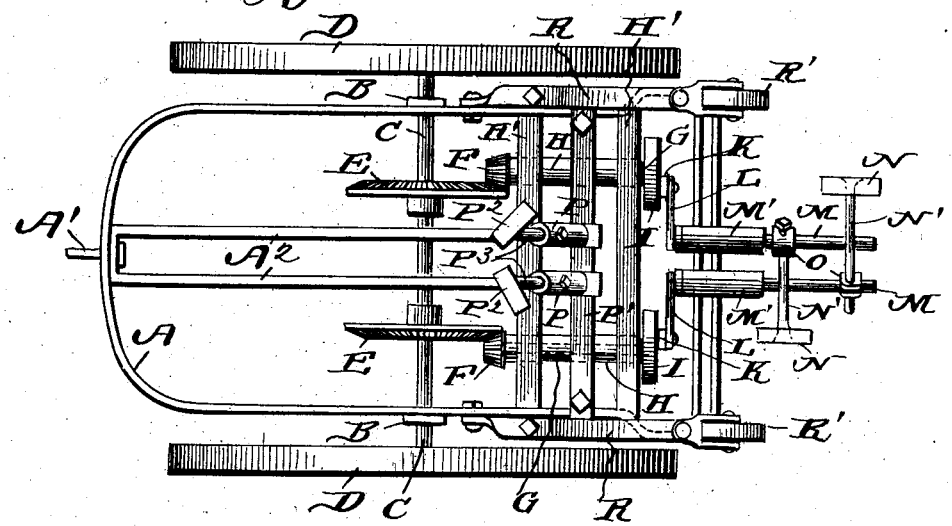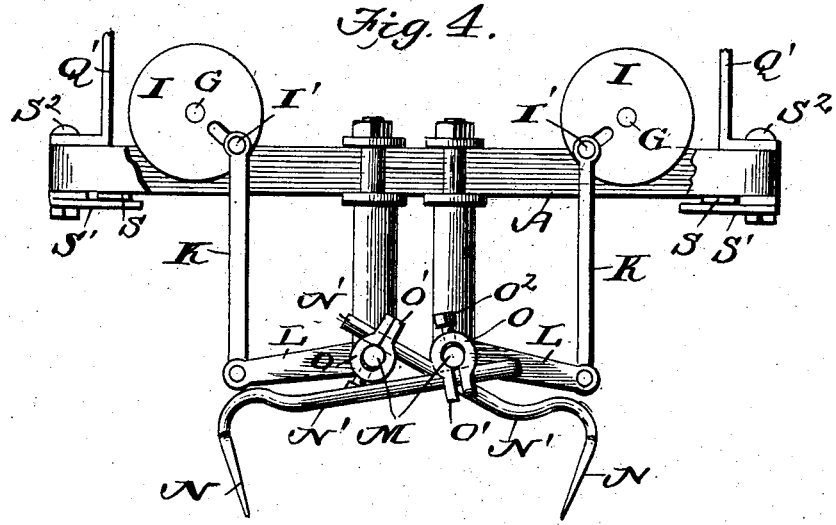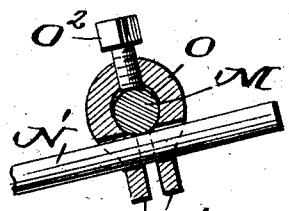

No. 762,714. Patented June 14, 1904.

UNITED STATES PATENT OFFICE.

GALVESTON HARWELL, OF CARTERSVILLE, GEORGIA.

COTTON CHOPPER AND CULTIVATOR.

SPECIFICATION forming part of Letters Patent No. 762,714, dated June 14, 1904.

Application filed January 10, 1903. Serial No. 138,565. (No model.)

*To all whom it may concern:*

Be it known that I, GALVESTON HARWELL, a citizen of the United States, residing at Cartersville, in the county of Bartow and State of Georgia, have invented a new and useful Cotton Chopper and Cultivator, of which the following is a specification.

This invention is a combined cotton chopper and cultivator, the object being to provide a simple and efficient device by means of which cotton can be chopped and cultivated.

Another object of the invention is to provide an exceedingly light and simple device so constructed and arranged that it will not easily get out of order; and a still further object is to provide certain novel means of connecting the chopping-hoes so that the said hoes can be quickly and easily attached and detached as desired.

With these various objects in view the invention consists in the novel features of construction and combination, all of which will be fully described hereinafter and pointed out in the claims.

Figure 1:
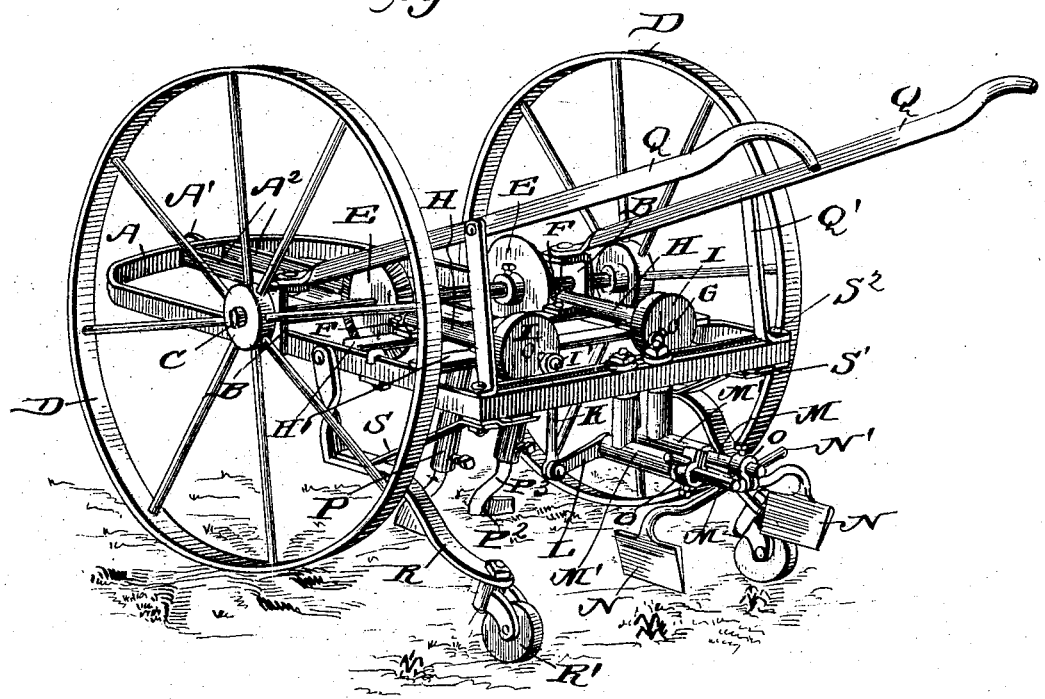
Figure 2:
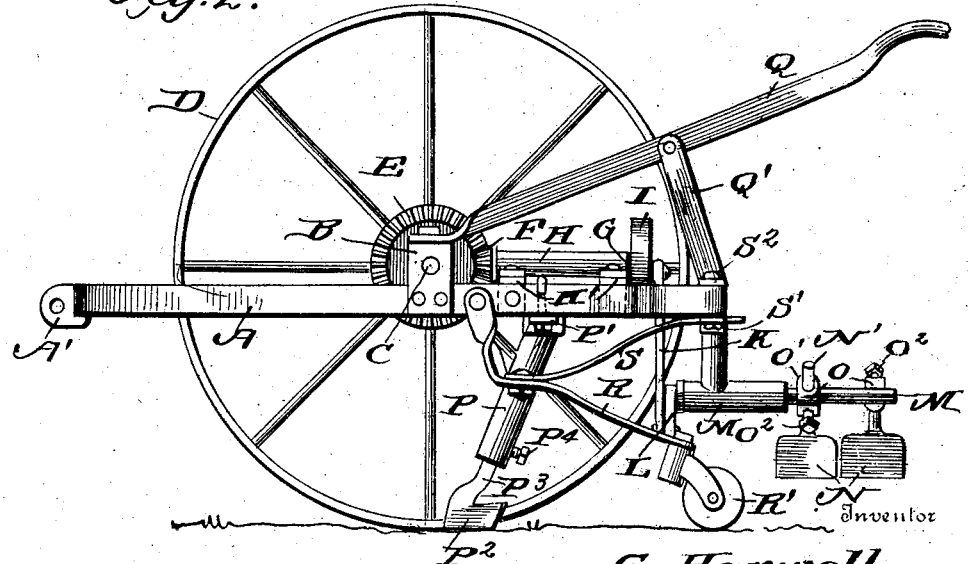

In the drawings forming a part of this specification, Figure 1 is a perspective view of the combined cotton chopper and cultivator constructed in accordance with my invention. Fig. 2 is a side view of the same. Fig. 3 is an inverted bottom plan view. Fig. 4 is a rear end view showing the manner of connecting and operating the chopping-hose, and Fig. 5 is a detail view illustrating the manner of connecting the shanks of the hoes.

In carrying out my invention I employ a main frame A, which is essentially rectangular in shape and preferably constructed of suitable bar-iron, a clevis A' being arranged at the forward end for the attachment of a suitable draft. (Not shown.) Brackets B are attached to the side members of the frame A midway their length, and journaled in said brackets is a horizontal shaft C, carrying the mounted or supporting wheels D at their outer ends. Oppositely-disposed bevel-gears E are mounted upon the shaft or axle C, said gears meshing with bevel-gears F, mounted upon the forward ends of the shafts G, which are journaled in suitable bars H, arranged upon cross-beams H', connecting the said members of the frame adjacent to the rear end, and upon the rear ends of the shafts G are the crank-disks I, having adjustable wrist-pins I', to which are connected the pitmen K, which pitmen K being connected to the crank-arm L are rigidly connected to the forward ends of the rock-shafts M, said shafts being journaled in suitable bearings M', suspended from the main frame, and attached to the said rock-shafts M are chopping-hoes N, the shanks N' passing through the perforated ears O' of the clamping-clip O, said clip being secured to the rock-shaft M by means of a set-screw $O^2$, and it is obvious that by passing the shank through the perforated portions of the clip the set-screw will effectively bind the rock-shaft M against the shank of the chopping-hoes, as most clearly shown in Fig. 5.

As the device is drawn forwardly the axle or shaft C will operate the bevel-gears E, which in turn will rotate the gears F and shaft G, and as the crank-disks I are rotated the pitmen K will be reciprocated and will impart a rocking motion to the shafts M, and the chopping-hoes N will thus be made to chop the cotton-plant at the point where it is desired and thin out or cut away the said plants. By loosening the set-screw $O^2$ the chopping-hoes can be quickly and easily detached from the rock-shaft M.

In order to provide for the cultivating of the cotton, I employ the depending tubular standards P, which are connected at their upper ends to the cross-beam P', secured to the main frame intermediate the cross-beam H'. The cultivator-teeth $P^2$ are provided with suitable shanks $P^3$, which are inserted in the lower ends of the tubular standards P and are securely fastened by set-screws $P^4$.

Handles Q are secured to the upper ends of the brackets B and are braced by suitable bars Q', extending from the handles to the rear end of the main frame. The frame is supported in this proper horizontal position by means of the depending legs R, carrying the caster-rollers R' at their lower ends, which legs have a spring-arm S, connected thereto, and the free end of each spring-arm works in a guide S', attached to the rear end of the frame at the under side thereof, thus permitting a certain amount of yielding movement for the supporting-legs and rollers in order that they may accommodate themselves to the irregularities of the ground over which the machine is moved. It will also be noted that the bolt S², which secures the brace Q', also serves to secure the guide S'.

If desired, the main frame A may also be strengthened by means of longitudinal beams A², extending from the front end of the frame to the cross-beam P'.

It will thus be seen that I provide an exceedingly simple and efficient construction of cotton chopper and cultivator and one which owing to its construction will be exceedingly light, strong, and durable.

Having thus fully described my invention, what I claim as new, and desire to secure by Letters Patent of the United States, is—

1. The combination with a suitable wheeled frame, of elongated tubular bearings arranged side by side and suspended from the rear of said frame, rearwardly-extending rock-shafts journaled in said bearings, rotatable disks arranged at the rear of said frame and on opposite sides, crank-arms connected to the inner ends of the rock-shafts, pitmen connected to the disks and to the crank-arms, chopping-hoes having their shanks arranged at right angles to the rock-shafts, each shank being connected to one of the shafts, and means for rotating the disks.

2. In a device of the kind described the combination with the main frame, a gearing device arranged thereon, bearings connected to the rear end of the main frame and depending therefrom, rock-shafts journaled in the said bearings, crank-arms attached to the forward ends of the rock-shafts, pitmen connected to the crank-arms, crank-disks having adjustable wrist-pins to which the upper ends of the pitmen are connected and the shafts to which the crank-disks are connected, said shafts being journaled upon the main frame and operated by the gearing device arranged thereon, and chopping-hoes having their shanks or handles detachably connected to the rear ends of the rock-shafts, as specified.

GALVESTON HARWELL.

Witnesses:
 FRANK S. BALE,
 CHAS. W. MORRIS.